D. G. SAUNDERS, Jr.
VEHICLE TOP.
APPLICATION FILED MAR. 31, 1916.
1,272,539.
Patented July 16, 1918.
2 SHEETS—SHEET 1.
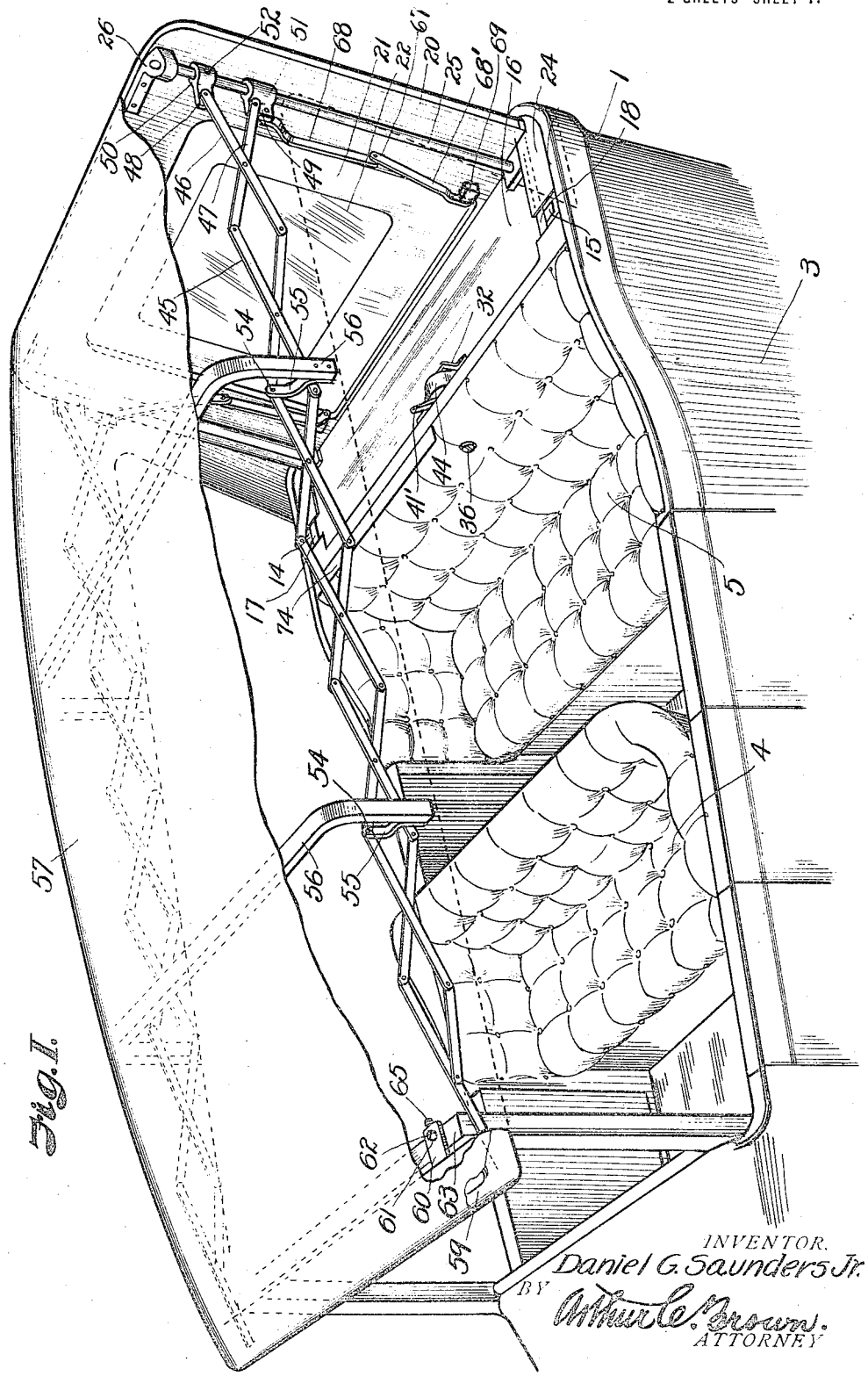
INVENTOR.
Daniel G. Saunders Jr.
BY
ATTORNEY

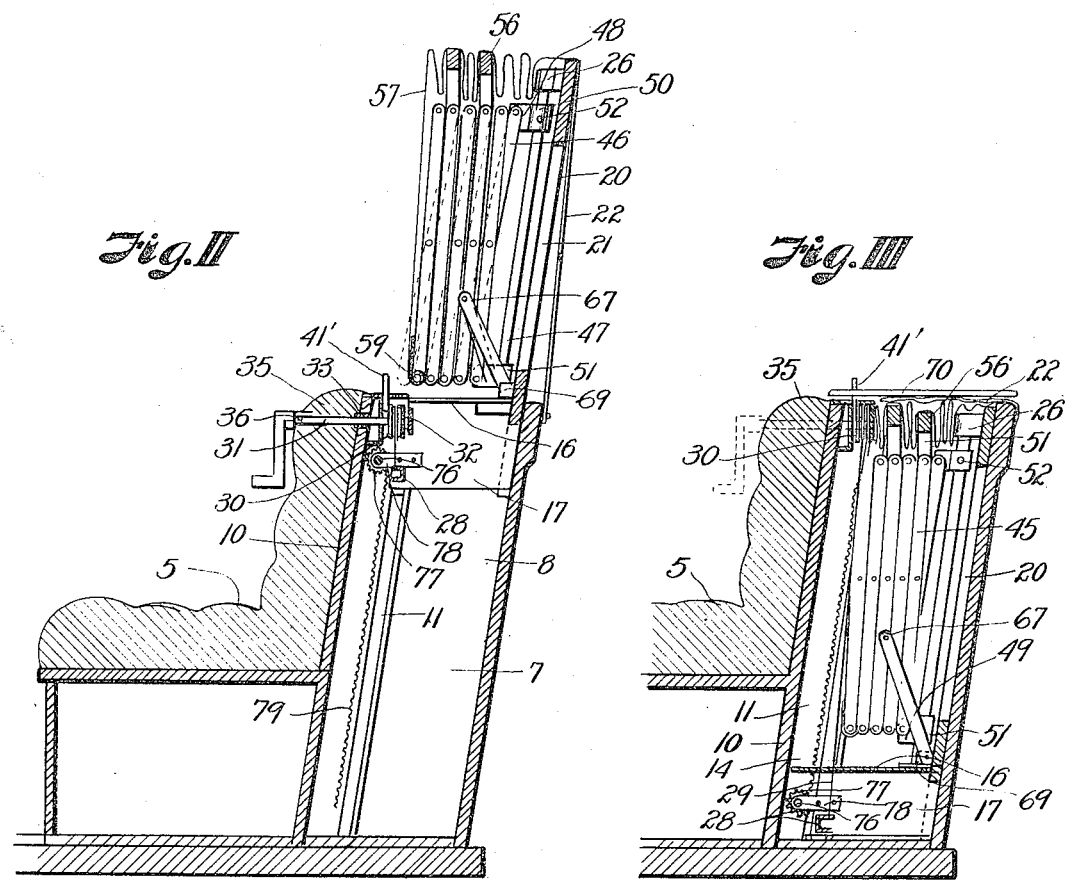

UNITED STATES PATENT OFFICE.

DANIEL G. SAUNDERS, JR., OF KANSAS CITY, MISSOURI.

VEHICLE-TOP.

1,272,539.

Specification of Letters Patent.

Patented July 16, 1918.

Application filed March 31, 1916. Serial No. 88,007.

*To all whom it may concern:*

Be it known that I, DANIEL G. SAUNDERS, Jr., a citizen of the United States, residing at Kansas City, in the county of Jackson and State of Missouri, have invented certain new and useful Improvements in Vehicle-Tops; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to vehicle tops, and more particularly to what is known as a "one man" top, for automobiles, the principal object of the invention being to provide a top which may be supported wholly from the rear of the vehicle and thereby obviate the necessity for side bows or front support and which may be completely housed within the rear portion of the vehicle when not in use, thereby enhancing the appearance of the vehicle and affording ready access to the top.

In accomplishing this and other objects of the invention, I have provided improved details of structure, the preferred forms of which are illustrated in the accompanying drawings, wherein:

Figure I is a perspective view of an automobile equipped with a top embodying my improvements, the top being shown in functional position and a part of the cover being broken away for better illustration.

Fig. II is a vertical section of the rear portion of the vehicle showing the top extended from the housing but not extended from the rigid back.

Fig. III is a similar view, showing the top housed.

Fig. IV is a perspective view of the interior of the housing, a part of the top being broken away for better illustration.

Fig. V is a detail perspective view of the pawl and ratchet mechanism for raising and lowering the top.

Fig. VI is a detail perspective view of the housing cover.

Referring more in detail to the drawings:—

1 designates an automobile of any ordinary type, comprising the body 3 and front and rear seats 4—5, the vehicle here shown being what is ordinarily known as a touring car although the invention is not limited to use with that particular type.

The body of the car extends rearwardly beyond the back of the rear seat to form a housing 7 within which my improved top may be contained when not in use, and attached to the end walls 8 of said housing and preferably located adjacent the front wall 10 thereof are vertical guides 11, preferably consisting of channel irons and having stops 12 at their upper ends for limiting the upward movement of the back member of the top.

Slidably mounted in the guides 11 are rails 14—15 and fixed to said rails and extending rearwardly therefrom are frame plates 17—18 that carry the rigid back presently described. Mounted on said plates and extending across the housing is a base member 16 which practically fills the housing and serves to close the same when the vehicle top is extended to functional position.

Fixed to the ends 17—18 of the base 16, is a rigid back member 20, having a window opening 21 therein within which a window of glass, mica or other transparent material may be located, and fixed to the upper edge of said back member is a flap curtain 22, which may be connected with the rear of the body to inclose the back member and enhance the appearance of the vehicle when the top is up.

Fixed to the top part of the base 16 and extending back of the channel irons 11 are plates 24 which serve to complete the cover of the housing and fixed to said plates are rods 25 that extend upwardly along the back member and slightly forward thereof, the upper ends of said rods being anchored in brackets 26 that are fixed to the front of the back member adjacent the upper edge thereof.

Fixed to the end portions 17—18 of the base 16 and extending therebetween at the front of the housing, is a lift bar 28, which also preferably consists of a piece of channel iron in order to give the bar rigidity while limiting its dimensions. Connected with said lift bar, at its longitudinal center is a cable 29 which is fixed to and wound on a drum 30 on a shaft 31 that is journaled in a bracket 32 on the front wall 10 of the housing and in the bearing 33 in said front wall. The said shaft being extended through the front wall of the housing and through the upholstering 35 of the seat 5 and provided with a wrench head 36 whereby the shaft may be actuated when a suitable wrench is applied thereto. The drive shaft is located at one side of the longitudinal center of the housing in order that the cable 29 may hang from the periphery of the drum to the center of the lift bar.

Fixed to the drum 30 is ratchet 38 and pivotally mounted on a pin 39 on the housing wall 10 is a pawl 40 having a tooth 41 for engaging the ratchet, and a handle member 41' that projects above the top wall of the housing so that it may be easily manipulated by a person wishing to release the drum when the top is to be lowered into the housing, the pawl having a spring 42 connected therewith and with a pin 43 on the wall 10 for yieldingly urging the pawl to its operative relation with the drum ratchet. The drum body is preferably inclosed within a casing 44 to protect occupants of the car from the drum or ratchet and to protect the drum parts, while the pawl is located outside of the casing in order that it may be readily accessible.

It is apparent that with this construction and arrangement of parts the back member 20 may be raised from the housing so that it will extend thereabove and may be lowered into the housing so that it may be completely contained therein, and that such raising and lowering of the top may be accomplished by a single person and by manipulation of the drum.

Mounted on the rod 25 at each side of the rigid back member 20 is a lazy tongs 45, the rear arms 46—47 of which are pivotally connected respectively with ears 48—49 of collars 50—51 on said rod, the upper collar 50 being rigidly secured to the rod, preferably by a pin 52 and the lower collar 51 being slidable on the rod, so that the sliding collar may move toward and from the fixed collar.

Each lazy tong comprises the usual links, having pivotal connection at their ends and having pivotal connection at their crossed points and mounted on the pins 54 at the upper joints of the links of the tong are depending brackets 55, to which the lower ends of ribs or bows 56 are rigidly secured, the said bows being extended transversely across the top to support a cover 57 of flexible material, there being as many bows as may be required to properly stretch and carry the cover member.

At the front of each lazy tong, a link is extended beyond its center pivotal point and fixed to the ends of the projecting links of the opposite tongs is a front bar 59, to which the forward end of the cover 57 is securely attached, and fixed to said cross bar are rearwardly projecting ears 60, having apertures 61 therein for receiving studs 62 on the upper rail 63 of a windshield or other frame at the front of the vehicle. The rear ends of the ears 60 carry set screws 65 for taking against studs 62 to anchor the top to the frame, the connection between the front end of the top and the frame 63 being provided merely to anchor or brace the top, as the top is supported wholly by the rigid back member and does not depend for its forward support on said forward frame.

Also pivotally connected with the ears 49 on the lower slide collars 51 at the back of the top are toggles 67 comprising links 68—68' that are pivotally connected at their lower ends to the rigid back members 20, preferably on blocks 69 on the back member, said toggles being arranged to break rearwardly so that the lower links 68' will lie against the front face of the rigid back member when the top is in functional position in order that the toggles may lie off center and prevent accidental displacement of the lazy tongs, although the toggles may break forwardly when the top is lowered in order to permit the lower tong collars 51 to slide downwardly along their carrying rods.

In order to cover the housing when the top is contained therein, I provide a cover member 70 (Fig. VI), comprising a rigid frame member 71, having pivotal connection and covered by suitable material 72, the cover being adapted for completely overlying the top of the housing and for attachment to the body of the vehicle to securely inclose the housed top and for folding when removed in order that it may be contained in a suitable receptacle of limited dimensions. The receptacle for containing the cover 70 is preferably located in the upholstery of the seat 5 and comprises a rack 73 that may extend into the top housing through an opening 74 in the back of the seat, so that when the top is up the cover may be contained within the rack, this arrangement forming a container for the cover which is convenient of access for the person manipulating the top.

In order to insure an even travel of the top when it is raised or lowered into the housing, I provide a cross shaft 76 that is revolubly carried in bearings 77 secured to the end plates 17—18, and secured at the ends of said shaft are pinions 78 adapted for meshing with rack faces 79 on the guides 11 so that when the top is raised or lowered both sides travel evenly and binding is prevented.

Assuming that the parts are constructed and assembled as described, and that the top is located within the housing, when it is desired to raise the top, a person may remove the lid 70 and place it in the rack at the front of the housing. With the lid removed the housing is exposed and a single person may, by the aid of the crank heretofore mentioned operate the drum 30 to wind the cable 29 thereon and thereby raise the side plates 17—18 that carry the rigid top member. As the base is raised, the rigid top is projected from the housing and adjacent the back wall thereof until the back member is in functional position, or when the upward movement is interrupted by the stops heretofore mentioned.

When the back member has reached its functional position, it is held by the ratchet and pawl mechanism on the drum, and the operator then extends the movable top by expanding the lazy tongs, this expansion being effected by pressing upwardly on the rear links of the tongs until the top is partly extended and then by manipulation of the toggle links 68—68'. As the toggles are extended, the collars 51 slide upwardly on the rods, and when the tongs have reached their full limit the toggle links break rearwardly to lock the sliding collars in position and prevent their accidental return along the rods and the collapse of the top. When the tongs have been fully expanded the forward end of the top extends over the front frame 63 and the ears 60 on the front cross bar may be located on the frame studs and the ears rigidly secured to the front member in order to brace the top and prevent its damage or injury by wind pressure while the vehicle is in motion.

When it is desired to lower the top, the operator has only to release the brace member on the front frame, break the rear toggles forwardly to release the slide collars and collapse the tongs, the collapse of the tongs folding the flexible top and drawing the bows 56 together so that when the tongs have completely collapsed, the bows and top will lie in folded relation along the rigid back member. The operator may then rock the pawl 40 to release the drum and let the rigid back member with the cover portion carried thereby, back into the housing. The housing cover may then be taken from the rack in which it has been contained and placed over the top of the housing to cover the housing.

It is apparent that with this construction the rigid back is supported from the cable 29 and held by the guides 11 at the front of the housing and that the top may be completely and entirely supported by the rigid back member and requires no support at the front of the vehicle. It is also apparent that this construction and arrangement makes it possible for a single person to easily and quickly raise and extend or return the top as the cover of the top is carried entirely by the lazy tongs from the rigid back member, and that the housing of the top, with its rigid back member, does not require an extended space at the rear of the vehicle, but affords a sightly means for carrying the top when down and protecting it from damage or from being soiled by weather or exposure.

Having thus described my invention, what I claim as new therein and desire to secure by Letters Patent, is:—

1. In combination with a vehicle body, having a housing therein, a rigid back member spaced from the front of the housing and movable vertically from or into the housing, lazy tongs carried by the back member adjacent the upper edge and at the front thereof, whereby when the back member is in its lowered position the said lazy tongs are contained within the housing in front of the back member, a cover mounted on said lazy tongs, and a toggle lever having a link connected with the lazy tongs and a link anchored to said back member, and operable to expand or collapse the lazy tongs, and movable, when expanded, past a dead center position into engagement with said back to retain the lazy tongs in extended position.

2. The combination with a vehicle body, having a housing at the rear, of a rigid back member movable into and from the housing, rods carried by said back member at the sides thereof and spaced therefrom, a fixed and a movable collar on each of said rods, lazy tongs having their rear links connected with the fixed and movable collars respectively, bows carried by said lazy tongs, and a cover carried by said back member and by the bows.

3. The combination with a vehicle body, having a housing at the rear, of a rigid back member movable into and from the housing, rods carried by said back member at the sides thereof and spaced therefrom, fixed and movable collars on each of said rods, lazy tongs having their rear links connected with the fixed and movable collars respectively, bows carried by said lazy tongs, a cover carried by said back member and by the bows, and toggle links connected with the back member and with the slidable collars for the purpose set forth.

4. The combination with a vehicle body having a housing at the rear, of a rigid back slidable in the housing, a cross bar on said back, a drum carried by said body at the front of the housing, a cable connecting the drum and cross bar, and means extending through the front of the housing for actuating said drum.

5. The combination with a vehicle body, having a housing at the rear, of a rigid back member slidable in said housing, a cross bar on said back member, a drum carried by said body at the front of the housing, a cable connecting the drum and cross bar, means extending through the front of the housing for actuating said drum, a ratchet connected with the drum, and a pawl for engaging said ratchet and extending to the exterior of the housing.

6. The combination with a vehicle body having a housing at the rear, of a rigid back member slidable in said housing, a cross bar on said back member, a drum carried by said body at the front of the housing, a cable connecting the drum and cross bar, and means extending through the front of the housing for actuating said drum, the said drum having a protective casing and the pawl being exposed at the outside of the casing.

7. The combination with a vehicle body, having a housing at the rear, of guides at the ends of the housing, a back member having rails slidable in said guides, a plate forming part of the back member and extending across the housing and forming a lower closure therefor, rods mounted on said back member and rising along and in spaced relation thereto, lazy tongs carried by said rods, a cover carried by said lazy tongs, means for locking the tongs in functional position, a cross bar on said back member, a drum on the front wall of the housing, a shaft fixed to said drum and extending through the front of the housing and having a crank head, a cable connected with the drum and cross bar, and pawl and ratchet mechanism for controlling the drum.

8. The combination with a vehicle body, having a housing at the rear, of a rigid back member movable into and from the housing, a cover carried by said back member and supported entirely therefrom, a cover for the housing and a receptacle at the front of the housing for containing said cover.

9. The combination with a vehicle body, having a housing at the rear, of a rigid back member movable into and from the housing, a cover carried by said back member and supported entirely therefrom, a cover for the housing and a receptacle at the front of and projecting into the housing for containing said cover.

In testimony whereof I affix my signature.

DANIEL G. SAUNDERS, Jr.